US008527947B2

(12) United States Patent
Clemm

(10) Patent No.: US 8,527,947 B2
(45) Date of Patent: Sep. 3, 2013

(54) SELECTIVE NOTIFICATIONS ACCORDING TO MERGE DISTANCE FOR SOFTWARE VERSION BRANCHES WITHIN A SOFTWARE CONFIGURATION MANAGEMENT SYSTEM

(75) Inventor: Geoffrey M. Clemm, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 12/344,583

(22) Filed: Dec. 28, 2008

(65) Prior Publication Data

US 2010/0169865 A1 Jul. 1, 2010

(51) Int. Cl.
*G06F 9/44* (2006.01)
*G06F 17/00* (2006.01)
*G06F 17/20* (2006.01)

(52) U.S. Cl.
USPC .......................................... 717/121; 717/122

(58) Field of Classification Search
USPC ........................................................ 717/121
See application file for complete search history.

(56) References Cited

U.S. PATENT DOCUMENTS

| | | | | |
|---|---|---|---|---|
| 5,805,889 | A * | 9/1998 | Van De Vanter | 717/107 |
| 6,151,606 | A | 11/2000 | Mendez | |
| 6,298,319 | B1 | 10/2001 | Heile et al. | |
| 6,336,215 | B1 | 1/2002 | Oberhauser et al. | |
| 6,523,027 | B1 | 2/2003 | Underwood | |
| 7,457,817 | B2 * | 11/2008 | Krishnaswamy et al. | 1/1 |
| 7,856,615 | B2 | 12/2010 | Clemm et al. | |
| 2002/0129106 | A1 | 9/2002 | Gutfreund | |
| 2002/0152271 | A1 | 10/2002 | Chafle et al. | |
| 2003/0014513 | A1 | 1/2003 | Ruths et al. | |
| 2003/0177481 | A1 * | 9/2003 | Amaru et al. | 717/148 |
| 2004/0216089 | A1 | 10/2004 | Kaler et al. | |
| 2004/0224674 | A1 | 11/2004 | O'Farrell et al. | |
| 2005/0131964 | A1 * | 6/2005 | Saxena | 707/203 |
| 2005/0193374 | A1 | 9/2005 | Harry et al. | |
| 2006/0101443 | A1 * | 5/2006 | Nasr | 717/163 |
| 2006/0150026 | A1 * | 7/2006 | Kolawa et al. | 714/38 |
| 2007/0067373 | A1 * | 3/2007 | Higgins et al. | 707/206 |
| 2007/0101256 | A1 * | 5/2007 | Simonyi | 715/511 |

(Continued)

OTHER PUBLICATIONS

Rule Authoring Infrastructure in JRules, Agile Business Rule Development, Mr. Jérôme Boyer, Prof. Hafedh Mili, 2011, Chapter 10, pp. 283-331.*

(Continued)

*Primary Examiner* — Li B Zhen
*Assistant Examiner* — Arshia S Kia
(74) *Attorney, Agent, or Firm* — Cuenot, Forsythe & Kim, LLC

(57) ABSTRACT

A system for controlling version branching can perform operations including, responsive to a user initiating a check-out operation of a file within a software configuration management system (SCMS), identifying the file and a workspace of the user and searching nodes of the repositories of the SCMS for a successor version of the file. When a successor version of the file is located within a node that is within a predetermined distance of the workspace of the user, a notification that the successor version of the file is within the predetermined distance of the workspace of the user can be output. When a successor version of the file is not located within a node within a predetermined distance of the workspace of the user, the file can be checked-out to the workspace of the user.

20 Claims, 4 Drawing Sheets

(56) References Cited

U.S. PATENT DOCUMENTS

| | | | |
|---|---|---|---|
| 2008/0033753 A1* | 2/2008 | Canda et al. | 705/2 |
| 2008/0059943 A1* | 3/2008 | Krevs et al. | 717/103 |
| 2010/0058294 A1* | 3/2010 | Best et al. | 717/122 |
| 2011/0252093 A1* | 10/2011 | Spataro et al. | 709/204 |

OTHER PUBLICATIONS

Yeung, L et al., "Aligning Design and Technology Infrastructures for a Collaborative Workplace: Considerations in Architechure and Design Practice", PDC 2002. Proceedings of the Participatory Design Conference, pp. 226-230, Jun. 23-25, 2002.

Jang Ho Lee, "A Software Architechure for Supporting Dynamic Collobaration Environment on the Internet", Journal of KISS: Computing Practices vol. 9, No. 2 p. 146-57, Apr. 2003.

Haake, J.M et al., "End-User Controlled Group Formation and Access Rights Management in a Shared Workspace System", Computer Supported Cooperative Work Conference Proceedings, p. 554-63, Nov. 6-10, 2004.

Micallef, J. et al., "The Asgard System Activity-Based Configuration Management," In Proc. of the SCM-6 Workshop on System Configuration Management (Mar. 25-26, 1996). Somerville, Ed. Lecture Notes in Computer Science, vol. 1167, Springer-Verlag, London, pp. 175-186.

Estublier, J. et al., "Impact of Software Engineering Research on the Practice of Software Configuration Management," ACM Trans. on Software Engineering and Methodology, vol. 14, No. 4, Oct. 2005, pp. 383-430.

* cited by examiner

US 8,527,947 B2

SELECTIVE NOTIFICATIONS ACCORDING TO MERGE DISTANCE FOR SOFTWARE VERSION BRANCHES WITHIN A SOFTWARE CONFIGURATION MANAGEMENT SYSTEM

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments of the present invention relate to software configuration management systems. A software configuration management system (SCMS) refers to a computer-based system that tracks various attributes of software that is being developed, and therefore, continues to evolve over time. Various functional and physical attributes of the software maintained within the SCMS can be tracked, allowing the state of the software to be preserved and revisited at different points in time throughout the development cycle. For example, a user may retrieve a copy of the software as it existed at a particular time in the past.

The SCMS imposes systematic control over changes to the software by providing functions such as file versioning and merging of different versions of files that may have been worked upon, in parallel or concurrently, by a plurality of different users or development teams. An SCMS provides these types of functions to maintain integrity and traceability with respect to development efforts relating to the software throughout the development lifecycle, which may span over years.

For example, an SCMS provides functionality that allows each of one or more users to "check-out" a copy of a file maintained within the SCMS. Each user may work on his or her own checked-out copy of that file independently of other users and, therefore, concurrently with other users. This situation, where different copies are generated and distributed to different users or development teams, can produce a "branch" in the history of the file. At some point, the branches of the file may need to be merged back together. In this manner, an SCMS can provide each individual user with a controlled environment in which to develop software. Through the SCMS, a user can, for example, control when changes introduced into the software by other users will be accepted into his or her own controlled development environment.

BRIEF SUMMARY OF THE INVENTION

The embodiments disclosed herein relate to software configuration management systems. One embodiment of the present invention can include a system for controlling version branching. The system can include a processor configured to initiate executable operations including, responsive to a user initiating a check-out operation of a file within a software configuration management system (SCMS), identifying the file and a workspace of the user and searching nodes of the repositories of the SCMS for a successor version of the file. When a successor version of the file is located within a node that is within a predetermined distance of the workspace of the user, a notification that the successor version of the file is within the predetermined distance of the workspace of the user can be output. When a successor version of the file is not located within a node within a predetermined distance of the workspace of the user, the file can be checked-out to the workspace of the user.

Another embodiment of the present invention can include a system for controlling project versioning. The system can include a processor configured to initiate executable operations including representing the SCMS as a graph including a plurality of nodes and a plurality of hops, wherein each hop represents an allowable data transfer between two nodes, wherein each hop is defined according to source-target relationships between nodes within the SCMS. Responsive to a user initiating a check-out operation of a file within the SCMS, the file to be checked-out and a workspace of the user to which the file will be checked-out can be determined. Each node of the SCMS that is within a predetermined number of hops from a node representing the workspace of the user, according to the graph, can be searched for a successor version of the file. When a successor version of the file is identified, a notification that the successor version of the file is within the predetermined distance of the workspace of the user can be output. When a successor version of the file is not identified, the file can be checked-out to the workspace of the user.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
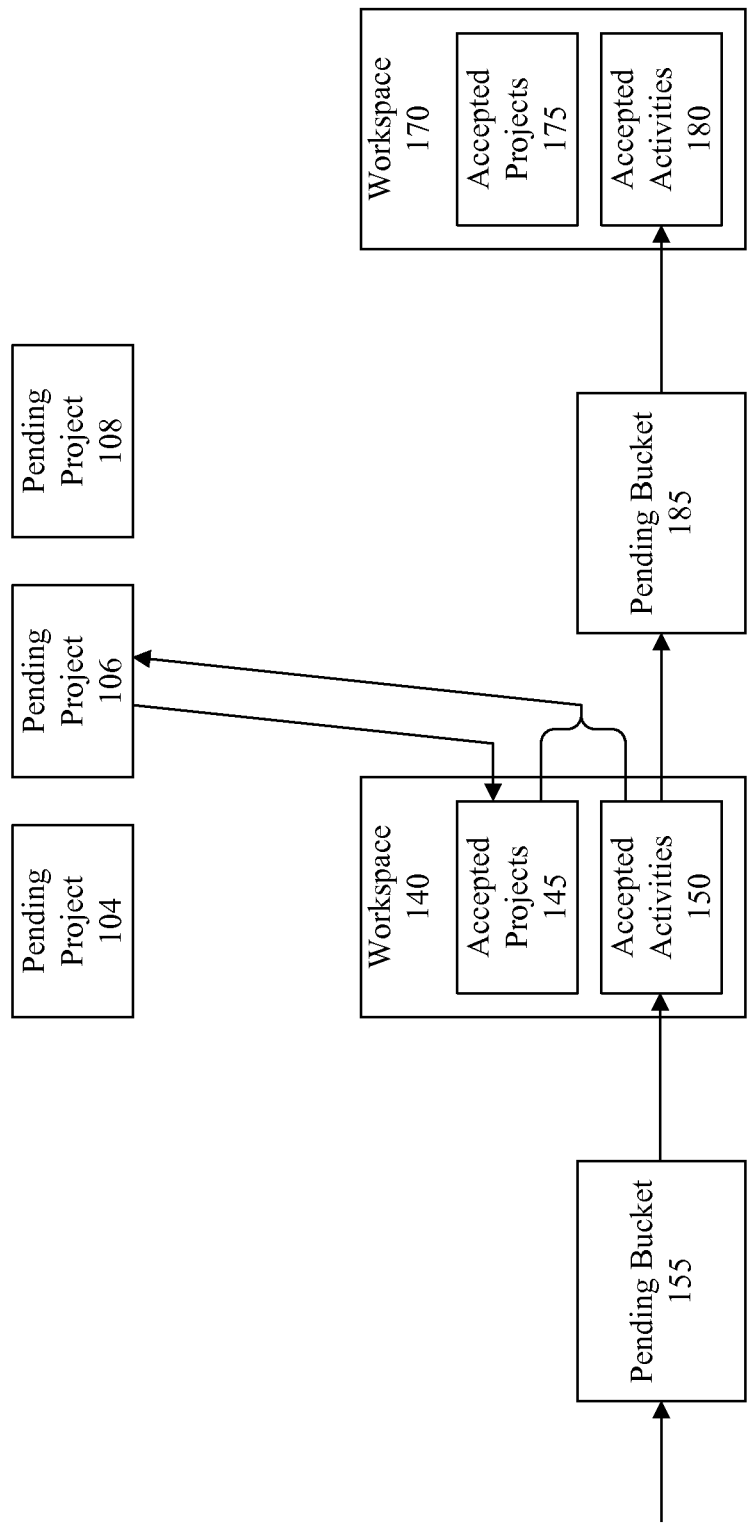
FIG. 1 is a block diagram illustrating a software configuration management system (SCMS) in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to software configuration management systems (SCMSs). In accordance with the inventive arrangements disclosed herein, an SCMS can evaluate the state of software being developed concurrently by a plurality of different users and/or development teams. When a user wishes to check-out software from the SCMS for storage into a user-specific workspace, the SCMS can notify the user whether one or more other versions of the software being checked have been created by other users according to a merge distance between those other versions and the version that would be created should the check-out operation continue.

Based upon the notification, or whether a notification is received, each individual user may decide whether or not to continue with the check-out operation of the file. When the file is checked-out, a copy of that file is created and stored within a workspace corresponding to the user that requested the check-out operation. In this sense, the file can be output to a workspace of a user. As used herein, "output" or "outputting" can include, but is not limited to, storing data in memory, e.g., writing to a file, "checking-out" a file, writing to a user display or other output device, e.g., playing audible notifications, sending or transmitting to another system, exporting, or the like.

Depending upon the merge distance, the user may choose to terminate the check-out operation to avoid possible merge operations that would be necessitated by virtue of the branching created by the check-out operation. For example, the user may choose to accept the activity that produced the successor version. Alternatively, the user that initially requested the check-out operation may choose to wait for the successor version to become available through normal accept and deliver operations within the SCMS.

One reason that a user may wish to avoid branching is the difficulty of merging particular types of files. When a user determines that the difficulty of merging two versions of a file is high, it may be desirable for that user to accept the latest version of that file, even if that means accepting changes to the software earlier within the development cycle than normal or scheduled.

Another motivation to avoid branching is that information in a later version of the file being checked-out may influence how the user wishing to check-out the file would implement a particular change. For instance, if code in a file has been refactored, e.g., re-written in order to improve readability or structure without affecting meaning or behavior, a user may wish to accept this version prior to making any further changes.

An example of this situation may be when a user needs to modify a directory by adding a new file. If a later version of that directory has already introduced a file with that same name, the user may have to subsequently rename that file and modify a number of files referencing the renamed file to avoid a conflict. In that case, it would be beneficial to obtain the later version of the directory rather than creating another file with that same name and risk duplicative or corrective work to change the file name when the conflict must be resolved in the merger of the two branches of that directory.

Another motivation to accept a later version of software would be if that later version contains changes that would simplify further work to be performed upon that software. For example, a change may have been introduced into a file that supports use of a static analysis tool. Accepting that version of the file, as opposed to branching from the earlier version without the modification, would allow the user also to use, and benefit from, the static analysis tool. Otherwise, the user would be forced to wait until those changes appear or become available within the normal course of software development in the SCMS.

There are numerous other situations in which it is beneficial to be notified that a file one is requesting to check-out has previously been modified by another user. Being notified of that condition as well as where the other version is within the SCMS and its distance and/or availability with respect to one's own workspace within the SCMS can be beneficial and avoid time consuming merge operations in the future.

FIG. 1 is a block diagram illustrating an SCMS in accordance with one embodiment of the present invention. SCMS 100 can be implemented as a computer system, e.g., a server, executing suitable server-side software. SCMS 100 can communicate with one or more other clients (not shown). In general, a computer suitable for storing and/or executing program code will include at least one processor coupled directly or indirectly to memory elements through a system bus. The memory elements can include local memory employed during actual execution of the program code, e.g., random access memory, bulk storage, such as disk-based memory, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the computer either directly or through intervening I/O controllers. Network adapters may also be coupled to the computer to enable the computer to become coupled to other computers or remote printers or storage devices through intervening private or public networks. Modems, cable modems, and Ethernet cards are just a few of the currently available types of network adapters.

Prior to continuing with a description of SCMS 100, it is useful to describe several concepts that are relevant to the operation of SCMS 100. The term "project," as used within this specification, can refer to a tree structure including one or more directories and one or more files stored or distributed throughout that directory structure stored in memory. For example, a project can be the complete set of source code files and/or development files, as organized or stored within a hierarchical directory structure, for a particular software product or software development effort. A project that is maintained within SCMS 100, and thus, is available for acceptance into a workspace within SCMS 100, can be referred to as a pending project. A pending project that has been loaded into a workspace of an individual user can be referred to as a "project."

SCMS 100 can include one or more pending projects 104, 106, and 108 stored in memory. A pending project, e.g., pending projects 104, 106, and 108, refers to the most recent version of a project that is available to users for accepting into a workspace. For example, pending project 104 can represent a particular directory structure inclusive of development files, e.g., source code files, libraries, and any other components of a particular software product or a particular release of a software product. Pending project 106 can be a different software product or a different release of the same software product represented by pending project 104. Pending project 108 can be yet another software product or another release of a software product.

Pending projects 104-108, as stored within SCMS 100, represent community accessible information. Community information, or community accessible information, refers to information such as pending projects 104-108 that may be accessed by more than one client of SCMS 100. In this case, a user may accept a particular pending project into a workspace of that user. Subsequently, the user can deliver that project back into the pending project of the SCMS 100, albeit in a changed form.

Each of a plurality of users may obtain, e.g., accept, a copy of a pending project maintained within SCMS 100 into a workspace corresponding to that user. While logically the same as each other copy of a same pending project obtained by other users, the copy of the pending project that is accepted into the workspace of the user that initiated the accept operation will be independent from those other copies once accepted into a workspace of the user.

Whereas the pending projects 104-108 are deemed community repositories, each of workspaces 140 and 170 can correspond to a single user. In one embodiment, workspaces 140 and 170 can be stored in memory of a user's client. In another embodiment, workspaces 140 and 170 can be stored in a portion of memory within SCMS 100 that is reserved for each user's respective workspace.

As shown, workspace 140 can be associated with a pending bucket 155 and workspace 170 can be associated with a pending bucket 185. Pending buckets 155 and 185, also may reside in memory within client devices or within memory of SCMS 100 dedicated for individual users. In any case, the various nodes, e.g., blocks, represented in FIG. 1 can represent individual storage devices that may be interspersed between SCMS 100 and client devices or can represent portions of a larger memory device residing within SCMS 100, e.g., a logical separation or partitioning of memory.

Workspace 140 represents a development environment within SCMS 100 in which only files that have been accepted by the user are stored. Workspace 140 can include two nodes 145 and 150. Each of nodes 145 and 150, and thus workspace 140, stores only software that has been explicitly accepted by the user of that workspace. The first node, called accepted projects 145, stores projects that have been accepted into workspace 140 from one of pending projects 104-108. That is, when a pending project such as pending project 106 is accepted by the user of workspace 140, a copy of that pending project is stored within pending projects 145.

The second node, called accepted activities 150, stores sets of file changes that have been accepted by the user of workspace 140. The term "activity," as used within this specification, can refer to a change set or, more particularly, to the set of information reflecting changes to files that have been implemented by a user. In illustration, consider the case where a user has accepted pending project 106 to accepted projects 145 and that project 106 includes 100 files. The user of workspace 140 may begin making changes to project 106 within workspace 140. The changes can be reflected as an activity that is stored within the node called accepted activities 150. Thus, if only files 1, 3, 6, and 7 of the 100 files numbered 1-100 of the project have changed, the activity would effectively be composed of the changes to files 1, 3, 6, and 7. The activity, specifying only the changes to files 1, 3, 6, and 7 can be stored in accepted activities 150. By combining the accepted activity with project 106 in accepted projects 145, a new configuration, e.g., a complete new state of project 106, can be specified. For example, the state of project 106 along with the activity specifying changes to project 106 can be delivered back as a new state of pending project 106.

Accepted projects 145 may include more than one different project according to the number of projects with which the user of workspace 140 is associated. For example, if the user is working on each of pending projects 104-108, that user may have a copy of each of pending projects 104-108, e.g., a project, within accepted projects 145. Each project 104-108 stored within AP 145 can have a state that differs from that of the corresponding pending project 104-108.

Within SCMS 100, each workspace may have a specified set of pending projects to which a project may be delivered. Such pending projects can be referred to as target pending projects with respect to the workspace delivering the project. Each repository may also be associated with a set of other pending projects from which a project may be accepted. Such pending projects from which a project may be accepted can be referred to as source pending projects with respect to the workspace that is accepting the project. In terms of delivering or accepting a project, such activities may only be performed between workspaces and pending projects. The set of source and target pending projects within SCMS 100 define paths through which data may flow among nodes.

In other cases, a user may deliver his or her activities directly to another user without delivering a project back into a pending project. For example, the user of workspace 140 may decide to share an activity stored within accepted activities 150, in reference to changes to any of the projects stored within accepted projects 145, with another user. Within SCMS 100, that activity can be delivered to a workspace of another user. That other user may decide to accept or reject that delivered activity. Accepted activities 150 are those activities that the user of workspace 140 has accepted into his or her workspace. Those activities delivered from other users, but not explicitly accepted by the user of workspace 140, are not stored within accepted activities 150.

Pending bucket 155, which is associated with workspace 140, can store activities and/or projects that have not been accepted into workspace 140. In general, any activity is included in pending bucket 155 will have been delivered directly from another the workspace of another client, e.g., client workspace 170. Until accepted, delivered activities are stored in pending bucket 155 and are not considered to be included within, or part of, workspace 140.

Workspace 170 can be substantially similar to workspace 140, with the exception that workspace 170 will belong to a different user. Thus, workspace 170 can include a first node called accepted projects 175 and a second node called accepted activities 180. Workspace 170 further is associated with a pending bucket 185 that stores any activities delivered directly from other workspaces within SCMS 100. While the structure of each of workspaces 140 and 170 may be similar, the actual contents of each workspace, e.g., the activities that have been accepted, the projects that have been accepted, and the activities that have been delivered but not yet accepted, will likely be different.

The arrows linking different nodes are provided for purposes of illustration only to indicate potential data transfers within SCMS 100. In general, a project may only be accepted into a workspace and delivered back into a pending project from a workspace. Thus, pending project 106 may be accepted into workspace 140 into accepted projects 145.

Activities may be delivered from one workspace to another. When an activity is delivered from one workspace to another, that activity must be delivered from a workspace of a source workspace to a pending bucket of a target workspace. For example, assuming that workspace 140 is to deliver an activity within accepted activities 150 to workspace 170, that activity is delivered from workspace 140 to pending bucket 185 of workspace 170. The activity does not flow directly from the workspace 140 into workspace 170. Once delivered in pending bucket 185, the user of workspace 170 must first accept the delivered activity prior to that activity entering accepted activities 180 of workspace 170.

Projects flow differently. Projects sent from one workspace to another must be sent from the accepted project node of the source workspace, e.g., accepted projects 145 of workspace 140, to a pending project, e.g., pending project 106. There, pending project 106 awaits acceptance by the user of a workspace prior to entering the workspace of the user, e.g., workspace 170.

Figure 2:
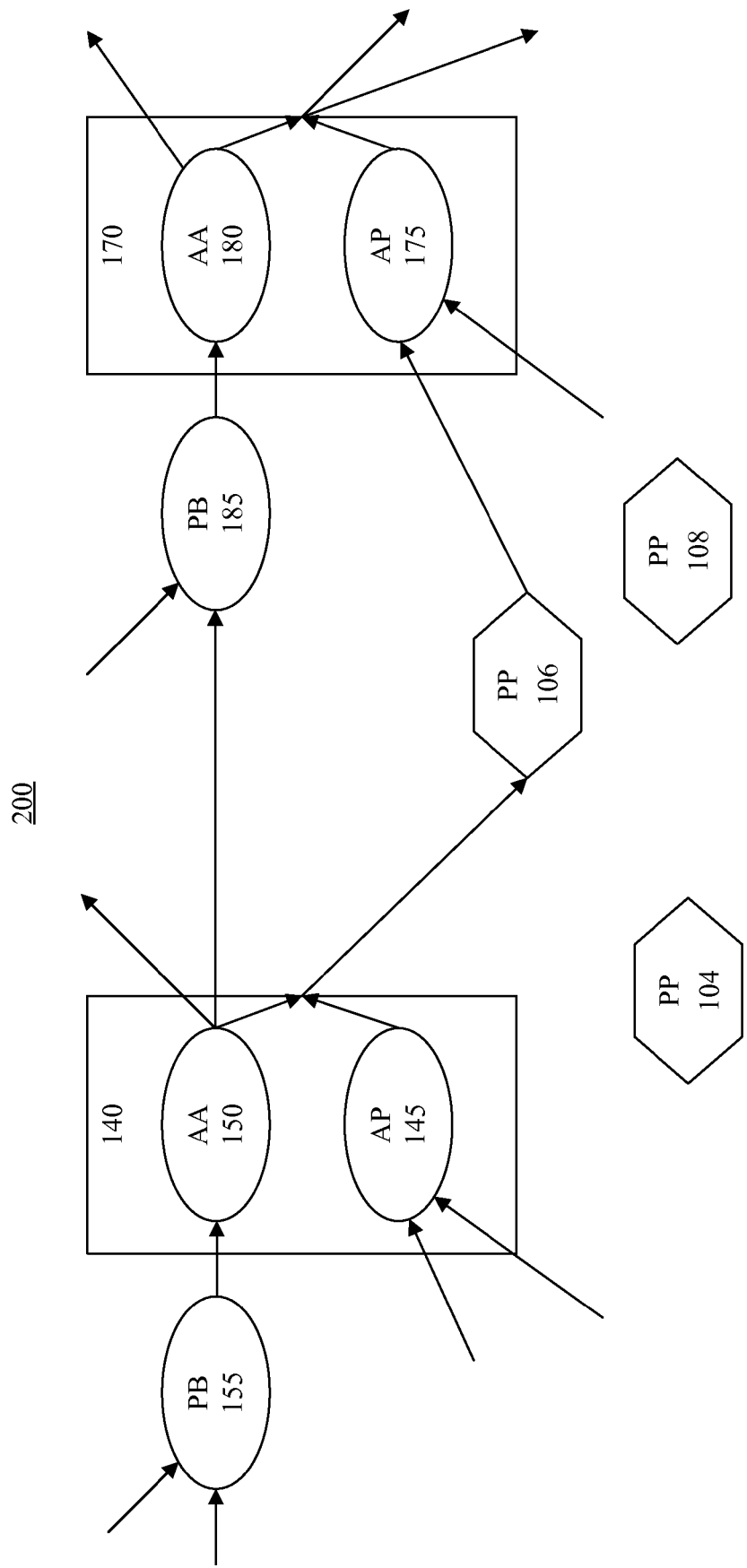
FIG. 2 is a first graph illustrating a technique for measuring merge distance within an SCMS in accordance with another embodiment of the present invention.

FIG. 2 is a graph 200 illustrating a technique for measuring merge distance within an SCMS in accordance with another embodiment of the present invention. FIG. 2 is a graph representation of the SCMS described with reference to FIG. 1 which indicates data transfers between respective nodes of the SCMS. For purposes of illustration, graph 200 still includes workspaces 140 and 170. Like reference numbers have been maintained to refer to same objects with respect to FIG. 1.

Within FIG. 2, pending bucket nodes are denoted as "PB" nodes 155 and 185. The accepted activity nodes are denoted as "AA" nodes 150 and 180. The accepted projects nodes are denoted as "AP" nodes 145 and 175. Accordingly, workspace 140 can include AP node 145 and AA node 150. PB node 155 is associated with workspace 140. Similarly, workspace 170 includes AP node 175 and AA node 180. PB node 185 is associated with workspace 170.

Graph 200 illustrates that each PB node flows only into the AA node of the corresponding workspace. Thus, PB node 155 flows only into AA node 150. PB node 185 flows only into AA node 180. Graph 200 also illustrates that projects may flow only into PP nodes. Thus, graph 200 illustrates that a baseline project, which may be taken from AP node 145 can be combined with an activity taken from AA node 150, and delivered to PP node 106. The new state of a project is defined by the baseline state in addition to the activity specifying changes made to that baseline state. Thus, a state of a project existing in workspace 140 will only be available to workspace 170 after that state of the project is delivered back into PP node 106 from workspace 140. The activity specifying the changes, however, may be delivered directly from AA node 150 to PB node 185, where it will remain until accepted by the user of workspace 170.

Each of the lines linking nodes of graph 200 can represent a "hop." Each hop is representative of some distance measure. The distance, at least in terms of an SCMS, can be transformed into a measure of time. For example, if the user of workspace 170 wishes to check-out a file, the SCMS will allow that user to do so. It may be advantageous, however, to notify the user of workspace 170 whether a later version of that file exists in a project or activity within a particular number of hops from workspace 170. The user corresponding to workspace 140, for example, may have previously created a new version of that file, referred to as a successor version of the file. In that case, if the distance, referred to as the merge distance, between the workspace of the user wishing to check-out the file and the node that includes that later version of the file, is within a predetermined distance, the user checking-out the file can be notified. This allows the user checking out the file to determine whether branching of the file is necessary.

If the file is checked-out and then checked-in, a new version of the file will be created and stored in a new activity within workspace 170 in AA node 180. That version may or may not need to be merged with the version of the file in workspace 140. With a notification that a successor version of the same file is within some predetermined distance, the user of workspace 170 may choose not to check-out the file at the present time and avoid the creation of another version of the file, thereby avoiding a future merge operation that would combine the version of the file from workspace 170 with the version of the file within workspace 140. The user of workspace 170 may, for example, wait until the version of the file from workspace 140 has been accepted through normal change flow. Alternatively, the user of workspace 170 may contact the user of workspace 140 and directly obtain the activity or the project containing that version from workspace 140.

The distance between two nodes in graph 200 may be expressed in hops, as noted. In another embodiment, the distance between two nodes can be converted into a measure of time. Each hop of graph 200 maybe assigned a default unit of time that is indicative of the amount of time typically needed for an updated version of software to traverse that hop from the source node to the target node. By measuring hops between two nodes of interest, that distance can be converted into time. As the SCMS continues to operate, the behavior of data exchanges between nodes can be observed. Using historical data, e.g., a histogram, an estimate of the amount of time for a project to be transferred across each hop can be determined and associated with hops in the graph. The time value can be determined as an average of the amount of time needed for prior projects to traverse the hop, a weighted average of the amount of time needed for prior projects to traverse the hop, a running average of the amount of time needed for prior projects to traverse the hop as measured over a predetermined number of the most recent days of operation of the SCMS, etc.

Individual users or groups of users also may declare when particular projects will be delivered to target nodes. As noted, each node may have one or more source nodes from which projects may be accepted. Each node further may have one or more target nodes to which projects may be delivered. The set of source nodes and target nodes for each node in graph 200 determines the hops connecting each respective node as well as the number of hops needed for a project to traverse from one node to another node. If a user announces that a particular project will be delivered on a particular schedule, e.g., weekly, that information can be used to update the measure of time associated with the hop defining the source-target node relationship. That is, the user will have specified the update frequency from his or her workspace, e.g., a particular node serving as the source node, to a particular target node. The declared time or schedule can be used to attach a measure of time to the hop defining the source-target node pair.

Figure 3:
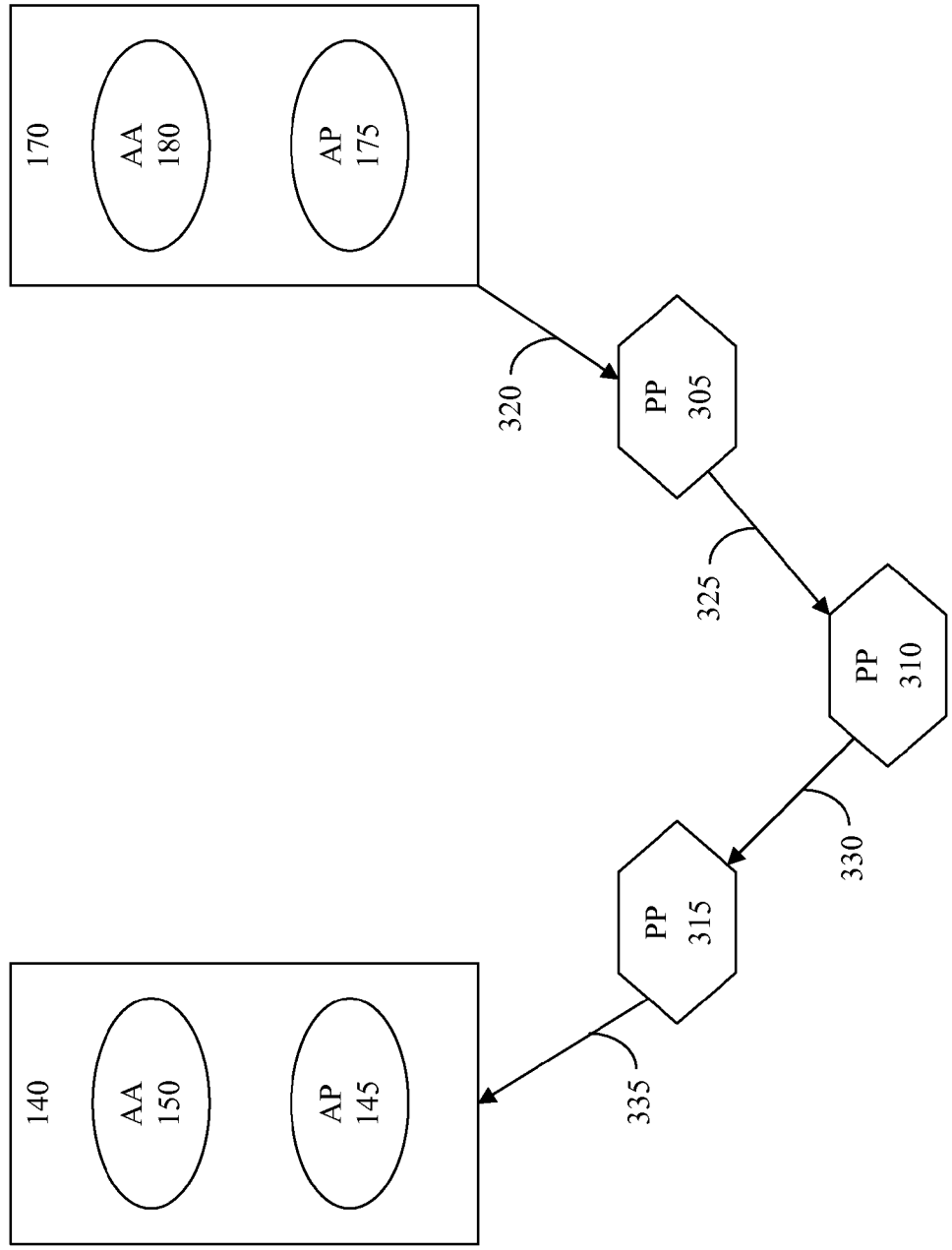
FIG. 3 is a second graph illustrating a technique for measuring merge distance within an SCMS in accordance with another embodiment of the present invention.

FIG. 3 is a graph 300 illustrating a technique for measuring merge distance within an SCMS in accordance with another embodiment of the present invention. More particularly, graph 300 illustrates a technique that can be used to determine the merge distance between two different versions of a file within an SCMS. As noted, the distance can be converted into a measure of time, e.g., an estimate of the time, for a particular version of a project to propagate from one node within the SCMS to another node within the SCMS.

Graph 300 illustrates a situation in which a user corresponding to workspace 140 wishes to check-out a particular file into his or her workspace. In this example, responsive to the user initiating the request, the SCMS can determine whether a successor version of the file already exists. For example, the user corresponding to workspace 170 has previously created a later version of that file. Accordingly, AP node 175 within workspace 170 will include a successor version of the file to be checked-out.

The SCMS can calculate the distance between AP node 175 and AP node 145 within workspace 140. When the distance is within a predetermined threshold distance, the SCMS server can notify the user of workspace 140 of the existence of the successor version of the file within AP node 175. This provides the user of workspace 140 with the opportunity to take one of several different actions. For example, the user of workspace 140 can proceed with creating a branch for the file. The user of workspace 140 can defer the checkout of the file until such time that the user of workspace 170 is likely to have delivered the updated project into a pending project node accessible to workspace 140, e.g., PP node 315. The user of workspace 140 can choose to discontinue the check-out operation and first accept the activity or project containing that successor version directly from workspace 170.

In this example, the SCMS determines the target node to which the successor version, when delivered from workspace 170, will be delivered. That node may be PP node 305. Workspace 140, however, does not accept projects from PP node 305. Rather, the source node for workspace 140 to accept a project, or at least the particular project desired, is PP node 315. Graph 300 illustrates that the file must propagate through PP node 305, to PP node 310, to PP node 315, in order to be checked-out into AP node 145 of workspace 140. In other words, for the file residing in AP node 175 to propagate to AP node 145, project A must traverse hops 320, 325, 330, and 335, e.g., four hops. Within this example, the intervening workspaces through which the project must traverse have not been shown. It should be appreciated that the project would propagate through such workspace nodes. Accordingly, each of hops 320, 325, 330, and 335, in this example, can represent a plurality of hops.

In one embodiment, the number of hops can be used or compared with a threshold number of hops. If the number of hops of the path calculated by the SCMS server is less than the threshold number of hops, the user of workspace 140 can be notified of the existence of the successor version within workspace 170. If not, the SCMS need not provide any notification as the successor version of the file is deemed too remote from workspace 140 to be of concern. It should be appreciated that the thresholds described within this specification, whether number of hops, other measures of distance or time, may be set by default and/or modified or set by each individual user.

Each PP node through which the project must traverse along the path of hops 320, 325, 330, and 335, for example, can represent a level in the hierarchy of the development process. Higher level projects, for instance, may be more reliable software builds that have undergone more testing than lower level projects, e.g., the difference between PP node 305 and PP node 315. This may mean, for example, that when the user of workspace 170 delivers a project, that project must traverse the hierarchy upward through one or more levels before that project may be available to the user of workspace 140 to accept into his or her workspace. The source and target relationships will define the hierarchy as well as any other intervening user workspaces that may require review of the project.

As noted, each hop can be associated with a measure of time, such as a day, for example. In that case, a four hop journey would require four days. Particular hops can be updated according to whether individual users or development teams have declared availability schedules within the SCMS. For example, hop 320 may have a default value of 1 day. The user of workspace 170, however, may declare that he or she will routinely deliver updates to PP node 305 on a weekly schedule. Accordingly, the time value associated with hop 320 can be modified according to when the next scheduled delivery of a project will take place based upon the scheduling information from the user of workspace 170 that is posted to the SCMS with respect to the time the check-out request is specified. Similarly, PP node 305 may be managed by a particular testing team. That team may post a schedule that updates will be delivered every other day. Accordingly, the measure of time associated with hop 320 can be adjusted according to when the next scheduled delivery is to take place relative to the time and/or date when workspace 140 requests check-out of the file. In general, the time values for each hop in the path between the two subject nodes can be summed to determine a total time for the path.

In another embodiment, the measure of time that is associated with a particular hop in graph 300 can be determined according to historical data of each respective node delivering projects to a target node as the SCMS operates over time. For example, if projects historically are passed, on average, every three days from PP node 305 to PP node 310, then the measure of time associated with hop 325 can be three days. Though not shown, it should be appreciated that some nodes will be connected by two hops, each hop moving in a different direction. In this regard, the measure of time associated with a hop moving from PP node 310 to PP node 315, for example, may not be the same as the measure of time associated with a hop (not shown) moving in the direct of PP node 315 to PP node 310, were such movement of projects possible as defined by the source-target relationships.

Figure 4:
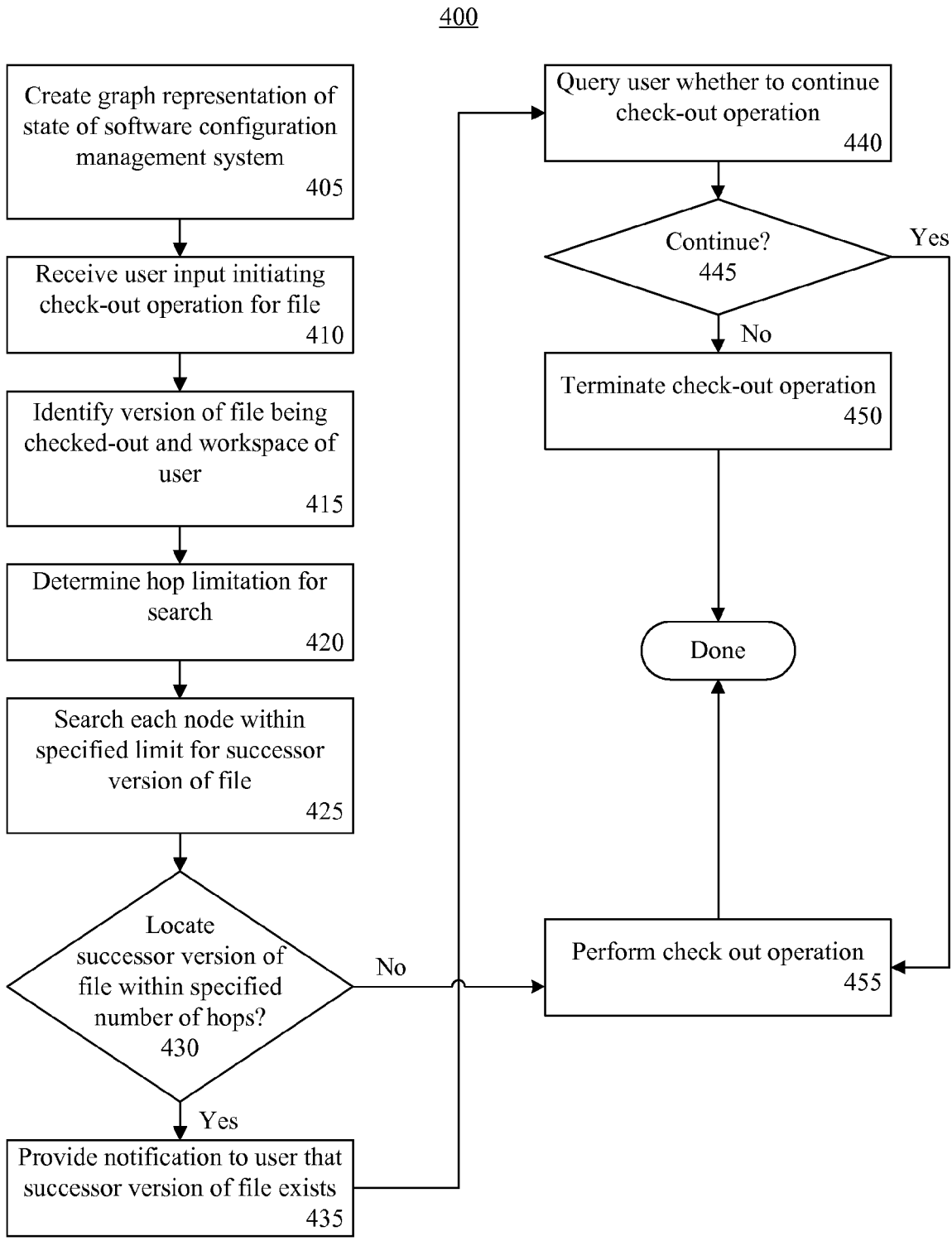
FIG. 4 is a flow chart illustrating a method of selectively notifying a user of other existing successor versions of a file according to merge distance within an SCMS in accordance with another embodiment of the present invention.

FIG. 4 is a flow chart illustrating a method 400 of selectively notifying a user of other existing versions of a file according to merge distance within an SCMS in accordance with another embodiment of the present invention. Method 400 can be implemented within an SCMS as described with reference to FIGS. 1-3. Beginning in step 405, a graph representation of the state of the SCMS can be generated and stored in memory. As described, the graph can include a plurality of nodes, where each node can include a set of activities and/or projects. Nodes of the graph can be connected by hops which indicate which nodes may serve as sources to other nodes and which nodes may serve as targets for nodes. The allowable paths through the graph are determined by these relationships, which are represented as hops connecting various nodes. In creating the graph, time values can be assigned to the hops as described and stored as part of the graph in memory. It should be appreciated that the graph may be updated from time-to-time or periodically as changes are made to the SCMS or as the SCMS continues to operate.

In step 410, a user input initiating a check-out operation can be received. A user, for example, may initiate a check-out operation for a selected file from a pending project node to the workspace of that user. In step 415, the SCMS can identify the particular version of the file that is the subject of the user input requesting a check-out operation received in step 410. The SCMS further can identify the particular workspace to which the file would be checked-out were the check-out operation to complete, e.g., the user's workspace, or node representing that workspace, within the graph.

In step 420, the SCMS can determine a hop limitation. The hop limitation can specify a maximum number of hops to search in terms of distance from the workspace, and in particular, the accepted project node within the workspace of the requesting user. As noted, a time limitation may be specified in the event that the SCMS assigns measures of time to hops of the graph. The SCMS can explore paths starting from the workspace of the requesting user, e.g., explore any paths beginning with hops that enter the workspace of the requesting user. Any other node that is reachable in a number of hops, or within the specified period of time, that does not exceed the threshold can be searched. This restriction can limit the number of nodes that are searched and prevents the SCMS from searching those nodes that are considered too remote from the requesting workspace.

In one embodiment, the search can be conducted as a breadth-first search. Other search techniques can, however, be used. As such, the embodiments disclosed within this specification are not intended to be limited solely to a breadth-first search implementation.

In step 425, each node that is within the specified limit can be searched for the existence of a successor version of the file to be checked-out. If a successor version of the file does exist within a node, e.g., within a project or an activity, that is within the specified number of hops, the method can proceed to step 435. In step 435, the system can notify the user of the existence of the successor version of the file. In one embodiment, by virtue of the notification, the user is aware that another version exists within the predetermined number of hops or within the predetermined amount of time of the user's workspace. The notification, which can be a tone or a message displayed upon the display of the user's client, may indicate the successor version that exists elsewhere, the particular node of the SCMS that includes the successor version, e.g., the workspace or pending project within which the successor version of the file exists, the distance or time away from the workspace of the requesting user, and any other information such as the identity of the particular user or development team that has the successor version of the file.

Accordingly, the user may decide whether or not to proceed with the check-out operation, particularly as checking-out the file will require a subsequent merge of the version of the file created by the requesting user with the successor version of the file located by the SCMS. Accordingly, in step 440, the SCMS can query the user whether he or she wishes to continue with the check-out operation of the selected file. In step 445, responsive to receiving a further user input, the SCMS can determine whether to continue with the check-out operation. If the user wishes to continue, the method can proceed to step 455, where the file is checked-out within the workspace of the requesting user.

If the user decides not to continue with the operation, the method can proceed to step 450, where the check-out operation is terminated. In that case, the requesting user may decide to wait until such time that the successor version of the file that exists elsewhere within the SCMS becomes available to the user or, alternatively, the requesting user may attempt to accept a project or an activity directly from the workspace of that other user.

Continuing with FIG. 4, in the event that no successor version of the file to be checked-out exists within a searched node, the method can continue to step 455. In step 455, the requested file can be checked-out. It should be appreciated that the SCMS may provide a notification stating that no other versions of the file to be checked-out exists within the predetermined number of hops or within the predetermined amount of time from the workspace of the user. Alternatively, the check-out operation can simply proceed automatically when no successor version of the file is found that has been checked-out by another within the searched nodes.

The Appendix that follows includes pseudo-code for performing a search of the variety described with reference to FIGS. 1-4. The pseudo-code implements a breadth first type of search within nodes that are located within a predetermined number of hops from the workspace to which the file will be checked-out. As noted, the embodiments presented within this specification are not intended to be limited by the particular type of search technique used.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

APPENDIX

```
/* node in a graph defining the deliver/accept flow of changes and configurations through
a set of workspaces */
class ChangeFlowNode {
  /*
    PENDING_CHANGE: a pending set of a workspace
    ACCEPTED_CHANGE: the changes in the accepted set of a workspace
    ACCEPTED_PROJECT: the projects in the accepted set of a workspace
    WORKSPACE_ACCEPTED: the accepted set of a workspace
    PENDING_PROJECT: a project
  */
  Integer kind;
  /*
    OUT: a ChangeFlowNode reachable from the source workspace
    IN: a ChangeFlowNode that can reach an OUT ChangeFlowNode
  */
  Integer direction;
  /*
    DONE: does not contain the target version
    TODO: either a ChangeFlowNode for the current change or identifies a DONE
  ChangeFlowNode in its previousChangeFlowNode field
  */
  Integer state;
  /* the workspace for a PENDING_CHANGE, ACCEPTED_CHANGE,
  ACCEPTED_PROJECT, or WORKSPACE_ACCEPTED ChangeFlowNode */
  Workspace workspace;
  /* the project for a PENDING_PROJECT ChangeFlowNode */
  PendingProject project;
  /* for an OUT ChangeFlowNode, the time to deliver the current change to that OUT
  ChangeFlowNode; for an IN ChangeFlowNode, the time to accept the successor version
  into the closest OUT ChangeFlowNode. */
  Integer duration;
  /* The previous ChangeFlowNode in the change flow */
  ChangeFlowNode previous;
  /* The set of next ChangeFlowNodes in the change flow */
  ChangeFlowNode[ ] next;
  /* If no matching cfn found via previous and next (recursively), add as a next TODO
  cfn. If there is a matching cfn and duration is less than that of the matching cfn, update
  the matching cfn with new duration. If the matching cfn is marked DONE, subtract the
  difference between the new and old duration from every IN cfn that can be reached
  (recursively) via the next field. */
  Void addTodo(Integer Kind, Integer Direction, Workspace workspace, PendingProject
  project, Integer duration) {
  }/*addTodo*/;
  /* the TODO ChangeFlowNode reachable via next with the miniumum Duration value
```

APPENDIX-continued

```
*/
  ChangeFlowNode minDurationTodo( ) { };
  }/*ChangeFlowNode*/;
/* result of a findFlow operation */
class FlowResult {
  Version version;
  ChangeFlowNode cfn;
  Integer duration;
  }/*FlowResult*/
/* find a FlowResult object, fr, such that:
- fr.version is a successor of sourceVersion
- fr.version has no successors
- there is a workspace, ws, to which there is a deliver/accept change flow path both from
fr.cfn and from sourceWorkspace.
- fr.duration is the maximum of the estimated durations for the flow from fr.cfn to ws and
the flow from sourceWorkspace to ws.
- fr.duration is no greater than bound.
- there is no other cfn and ws such that the maximum of the estimated durations for the
flows from fr.cfn and the source workspace to ws is less than fr.duration.
*/
ChangeFlowNode findFlow(
  Version sourceVersion,
  Workspace sourceWorkspace,
  Integer bound)
  /* maximum flow time investigated so far */
  Integer maxDuration = 0;
  ChangeFlowNode sourceCfn = new
    ChangeFlowNode (ACCEPTED_CHANGE, OUT, sourceWorkspace, NULL, 0);
  for (cfn = sourceCfn.minDurationTodo( );
    cfn != NULL;
    cfn = sourceCfn.minDurationTodo( )) {
if (maxDuration < cfn.duration) {
  maxDuration = cfn.duration;
  if (maxDuration > bound)
    return NULL; }/*if*/; }/*if*/;
cfn.setDone( );
ws = cfn.workspace( );
project = cfn.project( );
switch (cfn.direction) {
  case OUT: {
    switch (cfn.kind) {
      case PENDING_CHANGE: {
        duration = cfn.duration + ws.timeAcceptChange( );
        cfn.add(ACCEPTED_CHANGE, OUT, ws, NULL, duration);
        }/*case*/;
      case ACCEPTED_CHANGE: {
        cfn.add(WORKSPACE_ACCEPTED, OUT, ws, NULL, cfn.duration);
        duration = cfn.duration + ws.timePromoteChange( );
        foreach toWS in ws( ).deliveredToWorkspace( ) {
          cfn.add(PENDING_CHANGE, OUT, toWS, NULL, duration);
          }/*for*/; }/*case*/;
      case ACCEPTED_PROJECT: {
        cfn.add(WORKSPACE_ACCEPTED, OUT, ws, NULL, cfn.duration);
        }/*case*/;
      case WORKSPACE_ACCEPTED: {
        cfn.add(WORKSPACE_ACCEPTED, IN, ws, NULL, 0);
        duration = cfn.duration + ws.timePromoteConfiguration( );
        foreach toProject in ws( ).deliveredToProject( ) {
          cfn.add(PENDING_PROJECT, OUT, NULL, toProject, duration);
          }/*for*/; }/*case*/;
      case PENDING_PROJECT: {
        foreach toWS in cfn.project( ).acceptedByWorkspace( ) {
          duration = cfn.duration + toWS.timeAcceptConfiguration( );
          cfn.add(ACCEPTED_PROJECT, OUT, toWS, NULL, duration);
          }/*for*/; }/*case*/;
      }/*switch*/; }/*case*/;
  case IN: {
    switch (cfn.kind) {
      case PENDING_CHANGE: {
        foreach change in ws.Pending {
          foreach version in change.changeSet {
            if (version.hasPredecessor(sourceVersion)
              && version.isLeaf) {
              return new FlowResult(version, cfn, maxDuration);
              }/*if*/; }/*for*/; }/*for*/; }/*case*/;
        foreach fromWS in ws.deliveredFromWorkspace( ) {
          duration = cfn.duration + fromWS.timePromoteChange( );
          cfn.add(ACCEPTED_CHANGE, IN, fromWS, NULL, duration);
          }/*for*/; }/*case*/;
      case ACCEPTED_CHANGE: {
```

APPENDIX-continued

```
  duration = cfn.duration + ws.timeAcceptChange( );
  cfn.add(PENDING_CHANGE, IN, ws, NULL, duration);
  }/*case*/;
 case ACCEPTED_PROJECT: {
  duration = cfn.duration + ws.timeAcceptConfiguration( );
  foreach fromProject in ws( ).acceptedFromProject( ) {
   cfn.add(PENDING_PROJECT, IN, NULL, fromProject, duration);
   }/*for*/; }/*case*/;
 case WORKSPACE_ACCEPTED: {
  version = ws.selectedVersion(sourceVersion.history);
  if (version.hasPredecessor(sourceVersion) && version.isLeaf) {
   return new FlowResult(version, cfn, maxDuration);
   }/*if*/; }/*case*/;
  cfn.add(ACCEPTED_CHANGE, IN, ws, NULL, cfn.duration);
  cfn.add(ACCEPTED_PROJECT, IN, ws, NULL, cfn.duration);
  }/*case*/;
 case PENDING_PROJECT: {
  foreach fromWS in cfn.project( ).deliveredFromWorkspace( ) {
   duration = cfn.duration
    + fromWS.timePromoteConfiguration( );
   cfn.add(WORKSPACE_ACCEPTED, IN, fromWS, NULL, duration);
   }/*for*/; }/*case*/; }/*switch*/;
  }/*case*/; }/*switch*/; }/*for*/;
}/*findFlow*/;
```

What is claimed is:

1. A computer program product, comprising:

a non-transitory computer-usable storage medium having stored therein computer-usable program code that, when executed by a computer, controls version branching within a software configuration management system (SCMS), the computer-usable program code include computer-usable program code that, responsive to a user initiating a check-out operation of a file within the SCMS, identifies the file and a workspace of the user;

computer-usable program code that searches nodes of the repositories of the SCMS for a successor version of the file;

computer-usable program code that, when a successor version of the file is located within a node that is within a predetermined distance of the workspace of the user, outputs a notification that the successor version of the file is within the predetermined distance of the workspace of the user; and computer-usable program code that, when a successor version of the file is not located within a node within a predetermined distance of the workspace of the user, checks-out the file to the workspace of the user.

2. The computer program product of claim 1, wherein the computer-usable medium further comprises computer-usable program code that determines a distance between the node comprising the successor version of the file and the workspace of the user according to a number of hops to be traversed along a path linking the node comprising the successor version of the file and the workspace of the user through the SCMS.

3. The computer program product of claim 2, wherein the computer-usable medium further comprises computer-usable program code that assigns a measure of time to each hop of the path.

4. The computer program product of claim 1, wherein the computer-usable medium further comprises computer-usable program code that, for at least one selected hop within the path, determines a measure of time to be assigned to the selected hop according to a declaration of availability of the successor version of the file.

5. The computer program product of claim 1, wherein the computer-usable medium further comprises computer-usable program code that, for at least one selected hop within the path, determines a measure of time to be assigned to the selected hop according to a histogram of project transfers along the selected hop.

6. A system for controlling version branching, comprising:

a processor configured to initiate executable operations comprising:

responsive to a user initiating a check-out operation of a file within a software configuration management system (SCMS), identifying the file and a workspace of the user;

searching nodes of the repositories of the SCMS for a successor version of the file;

when a successor version of the file is located within a node that is within a predetermined distance of the workspace of the user, outputting a notification that the successor version of the file is within the predetermined distance of the workspace of the user; and when a successor version of the file is not located within a node within a predetermined distance of the workspace of the user, checking-out the file to the workspace of the user.

7. The system of claim 6, wherein the processor is further configured to initiate an executable operation comprising determining a distance between the node comprising the successor version of the file and the workspace of the user according to a number of hops to be traversed along a path linking the node comprising the successor version of the file and the workspace of the user through the SCMS.

8. The system of claim 7, wherein the processor is further configured to initiate an executable operation comprising assigning a measure of time to each hop of the path.

9. The system of claim 6, wherein the processor is further configured to initiate an executable operation comprising, for at least one selected hop within the path, determining a measure of time to be assigned to the selected hop according to a declaration of availability of the successor version of the file.

10. The system of claim 6, wherein
the processor is further configured to initiate an executable operation comprising, for at least one selected hop within the path, determining a measure of time to be assigned to the selected hop according to a histogram of project transfers along the selected hop.

11. The system of claim 6, wherein
the processor is further configured to initiate an executable operation comprising receiving a user-input specifying a limitation on a number of nodes to be searched.

12. The system of claim 6, wherein
the processor is further configured to initiate an executable operation comprising representing the SCMS as a graph comprising nodes and hops representing allowable connections between nodes, wherein each hop is defined according to source-target relationships between nodes defined within the SCMS.

13. The system of claim 12, wherein
the processor is further configured to initiate executable operations comprising:
defining a plurality of accepted project nodes, wherein each accepted project node corresponds to a workspace of a single user, wherein each accepted project node stores only accepted projects; and
defining a plurality of accepted activity nodes, wherein each accepted activity node corresponds to a workspace of a single user, wherein each accepted activity node stores only accepted activities.

14. The system of claim 13, wherein
the processor is further configured to initiate an executable operation comprising defining a plurality of pending bucket nodes, wherein each pending bucket node corresponds to a workspace of a single user, wherein each pending bucket node stores unaccepted activities.

15. The system of claim 14, wherein
the processor is further configured to initiate an executable operation comprising defining a plurality of pending project nodes, wherein each pending project node represents a community repository storing at least one state of a project.

16. A system for controlling version branching, comprising:
a processor configured to initiate executable operations comprising:
representing the software configuration management system (SCMS) as a graph comprising a plurality of nodes and a plurality of hops, wherein each hop represents an allowable data transfer between two nodes, wherein each hop is defined according to source-target relationships between nodes within the SCMS;
responsive to a user initiating a check-out operation of a file within the SCMS, determining the file to be checked-out and a workspace of the user to which the file will be checked-out;
searching each node of the SCMS that is within a predetermined number of hops from a node representing the workspace of the user, according to the graph, for a successor version of the file;
when a successor version of the file is identified, outputting a notification that the successor version of the file is within the predetermined distance of the workspace of the user; and
when a successor version of the file is not identified, checking-out the file to the workspace of the user.

17. The system of claim 16, wherein searching each node of the SCMS that is within a predetermined number of hops from a node representing the workspace of the user, according to the graph, for a successor version of the file further comprises:
identifying a node comprising an activity or a project that comprises the successor version of the file; and
counting a number of hops connecting the node comprising the successor version of the file and the node representing the workspace of the user.

18. The system of claim 17, wherein
the processor is further configured to initiate an executable operation comprising assigning a measure of time to each hop of the path and summing the measures of time.

19. The system of claim 18, wherein
the processor is further configured to initiate an executable operation comprising, for at least one selected hop within the path, determining a measure of time to be assigned to the selected hop according to a declaration of availability of the successor version of the file.

20. The system of claim 18, wherein
the processor is further configured to initiate an executable operation comprising, for at least one selected hop within the path, determining a measure of time to be assigned to the selected hop according to a histogram of project transfers along the selected hop.

* * * * *